May 30, 1961     E. ROESCH     2,986,182
TIRE MOUNTING WHEEL
Original Filed Feb. 9, 1959
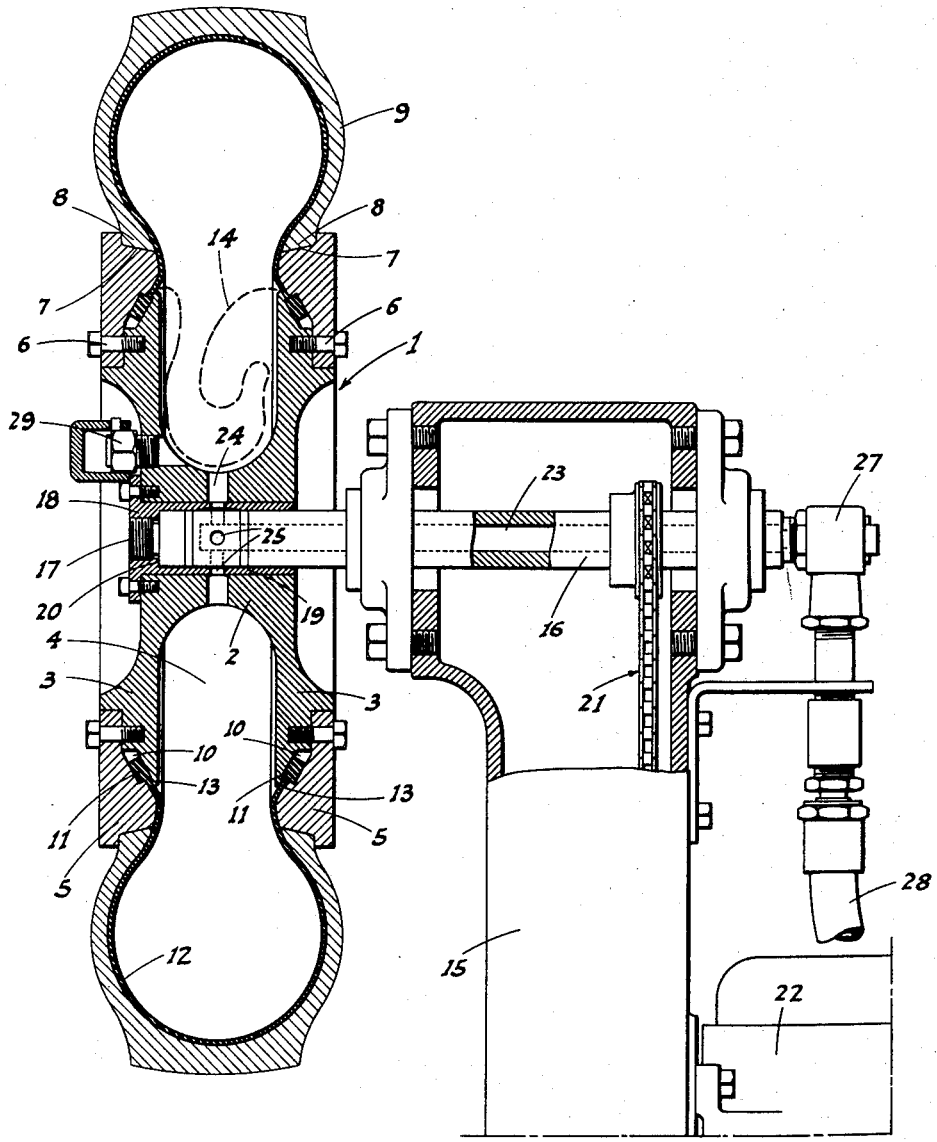
INVENTOR.
Ernst Roesch
BY
ATTYS

United States Patent Office 2,986,182
Patented May 30, 1961

2,986,182
TIRE MOUNTING WHEEL

Ernst Roesch, Lodi, Calif., assignor to Super Mold Corporation of California, Lodi, Calif., a corporation of California Original application Feb. 9, 1959, Ser. No. 791,906. Divided and this application Aug. 7, 1959, Ser. No. 832,381

1 Claim. (Cl. 144—288)

This invention relates to tire buffing machines, and particularly to a tire mounting wheel by means of which a tire is rotatably supported for engagement by the buffing rasp of the machine; the present application being a division of my copending application on Tire Buffing Machine, Serial No. 791,906, filed February 9, 1959.

The principal object of this invention is to provide a tire mounting wheel for the purpose which includes a collapsible air retaining diaphragm arranged to be inflated and which then simulates and takes the place of an air bag or inner tube. The tire may thus be maintained on the wheel in a normal or on-the-vehicle form, and in effect locked to the wheel in driving relation therewith.

A further object of the invention is to construct the wheel so that the diaphragm when deflated and still mounted on the wheel offers no interference with the mounting of the tire on the wheel, or its removal therefrom.

Another object of the invention is to so mount the diaphragm on the wheel that while secured to the wheel for rotation therewith as a unit, said diaphragm may be readily detached from the wheel at any time a replacement may be necessary.

It is also an object of the invention to provide a practical, reliable, and durable tire mounting wheel, and one which will be exceedingly effective for the purpose for which it is designed.

These objects are accomplished by means of such structure and relative arrangement of parts as will fully appear by a perusal of the following specification and claims.

The figure on the drawing is a sectional elevation of the wheel as supported on the buffing machine and with a tire, in an inflated and normal form, mounted on the wheel.

Referring now more particularly to the drawing, and to the characters of reference marked thereon, the wheel, indicated generally at 1, comprises a hub portion 2 from which laterally spaced flanges 3 project radially out to provide a deep circumferentially extending well 4 therebetween. The flanges 3 include extension flanges or ring members 5 which overlap and project radially out from said flanges 3, being detachably secured thereto by cap screws 6 or the like. The flanges 3 and ring members 5 thus, together, form a rigid unit. The ring members 5 at their outer circumference are formed with continuous retaining seats 7 for the beads 8 of a tire 9. These seats are spaced apart laterally a distance to maintain the beads 8 in normal spaced relation.

The overlapping portions of the flanges 3 and the ring members 5, radially out from the cap screws 6, are spaced apart somewhat to provide annular grooves 10 therebetween. The radially inner portions of these grooves are shaped to receive the enlarged base beads 11 of a full-circle, flexible and collapsible diaphragm 12 in air-tight relation; the diaphragm when inflated being substantially U-shaped in section and snugly fitting in the tire.

It should be noted that the beads 11 can only be mounted in the grooves 10 by first removing—or at least loosening—the outer ring members 5; the subsequent tightening of the cap screws 6 causing the beads 11 to be compressed and thus providing the desired air-tight connection between the beads and the well 4 of the wheel.

It will also be noted that the grooves 10 are disposed in radially outward converging relation as clearly shown in the drawing; said grooves opening into the well 4 in opposed facing relation. Also, the bead engaging seats 7 in said ring members are just as wide—laterally—as said beads 8, so that the laterally inner edges of the beads are flush with the corresponding laterally inner faces of the ring members, as shown.

By reason of this arrangement, the diaphragm 12, upon leaving the confines of the grooves, smoothly engages the laterally inner faces of the ring members 5, and then that of the tire, without any abrupt changes in direction being necessary. There are thus no sharp corners or edges which the diaphragm must engage and which would tend to chafe and weaken the same.

The grooves 10, for a short distance radially out from the bead engaging portions thereof, are restricted in width, as at 13, so that there is no tendency for the beads 11 to be pulled out from the grooves. The edges of the grooves which are in the flanges 3 terminate—at their radially outer ends—short of the laterally inner faces of the ring members 5, as shown. This arrangement enables the diaphragm 12, when deflated, to be readily collapsed into the well 4 without any sharp bending thereof, as indicated at 14, so that the tire may be easily mounted on the wheel 1 without interference from the diaphragm.

As previously stated, the diaphragm is shaped so that when inflated it fits snugly and pressingly within the tire and thus takes the place of the usual inner tube; the tire then assuming its normal form, with the beads thereof drivingly locked to the seats 7 of the wheel by reason of the pressure within the diaphragm.

The wheel is mounted for rotation, and air supplied to the diaphragm as required, by means of the following structure:

The wheel 1 is intended to be mounted with its axis horizontal, and to this end a vertical hollow pedestal 15, which is part of the previously identified buffing machine, turnably supports a horizontal spindle 16 projecting from one side of the pedestal. At its outer end this spindle is provided with a short threaded extension 17 of reduced diameter, adapted to screw into a tapped socket 18 formed in the outer end of a sleeve 19 secured in the wheel hub 2, and in which a portion of the spindle outwardly of the pedestal snugly fits. The inner end of the socket 18 forms a shoulder 20 against which the spindle 16 bears when the extension 17 is tightly screwed into the socket.

The spindle 16 is driven at a suitable speed by an endless chain and sprocket unit 21 within the pedestal and operated by a motor on the outside of the pedestal, and indicated in part at 22.

The spindle 16 is formed with an internal longitudinal passage 23 one end of which is adjacent but short of the outer hub engaging end of the spindle. The outer end portion of said passage communicates with the well 4 by means of radial ports 24 in the hub, and matching ports 25 in the spindle 16 and sleeve 19.

The opposite end of the spindle 16, which projects from the corresponding end side of the pedestal 15, is provided with a swivel passage unit 27 of conventional form, and which communicates with the adjacent end of the spindle passage 23. The unit 27 is connected to an air hose 28 leading from a suitable source of air pressure (not shown). A vacuum may also be created in passage 23 so as to cause the diaphragm 12 to be positively collapsed into the well 4 and clear of the tire.

A pressure relief valve 29 in the outer wheel flange 3 connects the well 4 with the outside atmosphere so that air within the well and tire may be held at any desired pressure.

It will be understood that a different size wheel must be provided for each different bead size of tire to be buffed; the simple screw connection 17—18 between the wheel-hub mounted sleeve 19 and the spindle 16 enabling a wheel change to be effected in a minimum of time.

As an alternative, extension ring members 5 of different diameters, to provide tire-bead seats 7 of different diameters and lateral spacing, may be provided for application to the one wheel, as well as correspondingly sized diaphragms.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired.

A tire mounting device for a tire treating machine comprising a wheel having a hub and transversely spaced members rigid with the hub and formed with annular seats to engage and support the beads of a tire, a horizontal drive spindle, means rotatably mounting one end of the spindle in an axially fixed position with a portion of the spindle projecting from the mounting means, and a relatively small-diameter threaded extension projecting from the outer end of said projecting portion of the spindle and providing a shoulder at the junction of said extension and said spindle; the hub having a plain bore therein to receive the projecting portion of the spindle in fitting relation, and a tapped bore at one end of said plain bore of a reduced size to receive and engage said threaded extension of the spindle and providing a shoulder at the junction of said bores to engage the shoulder of the spindle.

References Cited in the file of this patent

UNITED STATES PATENTS

| | | |
|---|---|---|
| 1,777,405 | Frank | Oct. 7, 1930 |
| 2,182,176 | Maranville | Dec. 5, 1939 |
| 2,399,572 | Powell et al. | Apr. 30, 1946 |
| 2,728,105 | Pacciarini | Dec. 27, 1955 |
| 2,888,065 | Neilsen | May 26, 1959 |
| 2,924,255 | Robbins | Feb. 9, 1960 |